(No Model.)

J. E. DOYLE.
GLOBE VALVE GRINDER.

No. 293,723. Patented Feb. 19, 1884.

WITNESSES:
Francis McArdle
C. Sedgwick

INVENTOR:
J. E. Doyle
BY Munn & Co
ATTORNEYS.

UNITED STATES PATENT OFFICE.

JOHN EDWARD DOYLE, OF RICHMOND, INDIANA.

GLOBE-VALVE GRINDER.

SPECIFICATION forming part of Letters Patent No. 293,723, dated February 19, 1884.

Application filed October 20, 1883. (No model.)

*To all whom it may concern:*

Be it known that I, JOHN E. DOYLE, of Richmond, in the county of Wayne and State of Indiana, have invented a new and Improved Globe-Valve Grinder, of which the following is a full, clear, and exact description.

This invention consists in a cylindrical socket armed with sharp steel points at its lower extremity, together with a bushing, and is for the purpose of grinding globe and other valves to a joint on their seats.

Reference is to be had to the accompanying drawings, forming part of this specification, in which similar letters of reference indicate corresponding parts in all the figures.

Figure 1:
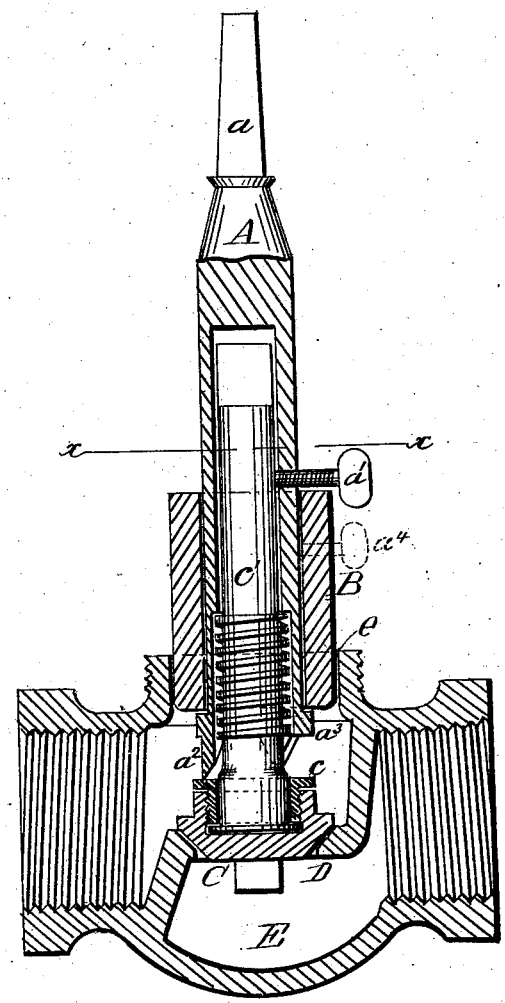
Figure 2:
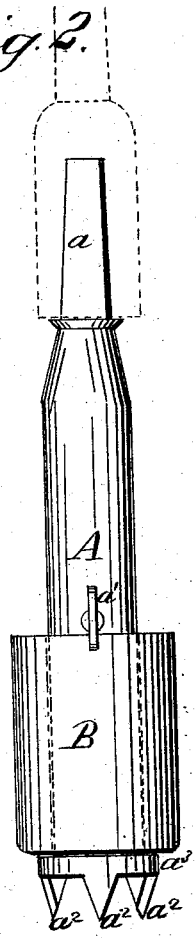
Figure 3:
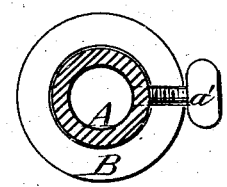

Figure 1 is a sectional elevation of my device, and of the valve to which it is applied. Fig. 2 is an elevation of the socket and bushing; and Fig. 3 is a cross-section of the socket, showing also the bushing, on the line $x\,x$ of Fig. 1.

A is the cylindrical socket, provided at its upper end with a square stem, $a$, for the reception of a brace by which it is turned, and which may have near its lower end a flange, $a^3$. On the lower extremity of the socket A are sharp teeth $a^2$, case-hardened or made of steel, two or more in number, and arranged around the lower annular edge of the socket A. The socket A is of such inner diameter that it will fit over the valve-stem $c'$, and of such length as to allow the teeth $a^2$ to rest on and be slightly embedded in the top of the valve C, or in the top of the screw-washer $c$ thereof. The outer diameter of the socket A may be such that it will fill and revolve in the opening $e$, through which the valve C is placed on its seat D; but I preferably make the socket A smaller than the said opening $e$, and use the bushing B, fitting and arranged upon the socket A to fill up the opening $e$. Bushing B may be made of different sizes, so that the tool may be adapted to valves having the opening $e$ of various diameters. Bushing B is of such a length that it will fill the space on the socket A between the flange $a^3$, on which it rests, and the set-screw $a'$, by which it will then be retained in its position. Set-screw $a'$ is inserted in a hole adapted for its reception in the side of the socket A at such a distance above its lower end that that portion of the valve-stem $c'$ which forms the joint with the cap will not be injured by set-screw $a'$.

The operation is as follows: The hand-wheel is removed from the valve-stem, and the cap by which the valve C is secured to its seat is also removed. Then the socket A, connected with the bushing B, is placed over the valve-stem $c'$ until the teeth $a^2$ rest on the valve C, or on the screw-washer $c$ thereof, into which they are, by a light blow on the upper end of socket A, slightly embedded, and the socket A is secured to the valve-stem $c'$ by tightening the set-screw $a'$. The valve C is then removed from its seat D, and the seat of the valve covered with a preparation of oil and emery. The valve C is then replaced on its seat D, and rotated thereon by means of the socket A until the valve and seat are sufficiently ground. The valve C, connected with the socket A and bushing B, may be removed and replaced from time to time, to allow more emery and oil to be applied, as required, and thus the grinding continued until a perfect joint is secured.

Although I preferably use the set-screw $a'$ for securing the bushing B to the socket A and the socket A to the valve-stem $c'$, yet the socket may be used without it, the firm connection between the teeth $a^2$ and the valve C being secured by pressure applied through the brace by which the tool is operated; or I may use a set-screw, $a^4$, for securing the bushing to the socket, and dispense with the flange $a^3$.

The advantages obtained by my invention are in its easy application to grinding valves of various dimensions, and especially to grinding worn-out valves without removing the valve shell and seat from the pipe of which it forms a part, and thus making the repairs cheaply and expeditiously; also, in that the construction and adaptation of the tool are such that the valve may be securely grasped and rotated without injury to the valve-stem or other wearing-surface.

Having thus described my invention, what I claim as new, and desire to secure by Letters Patent, is—

1. The socket A, constructed, substantially as described, with teeth adapted to engage the valve or its washer, as set forth.

2. The combination of the socket A, provided with teeth $a^2$, with bushing B and means for securing said bushing to the socket, substantially as set forth.

3. The combination of the toothed socket A $a^2$, provided with the annular flange $a^3$, with the bushing B, resting against said flange, and a set-screw for securing said bushing to the socket, substantially as set forth.

JOHN EDWARD DOYLE.

Witnesses:
W. J. SMITH,
JOSEPH D. FLEMING.